J. PORTER.
Cooking Stove.
No. 4,274.
Patented Nov. 18, 1845.
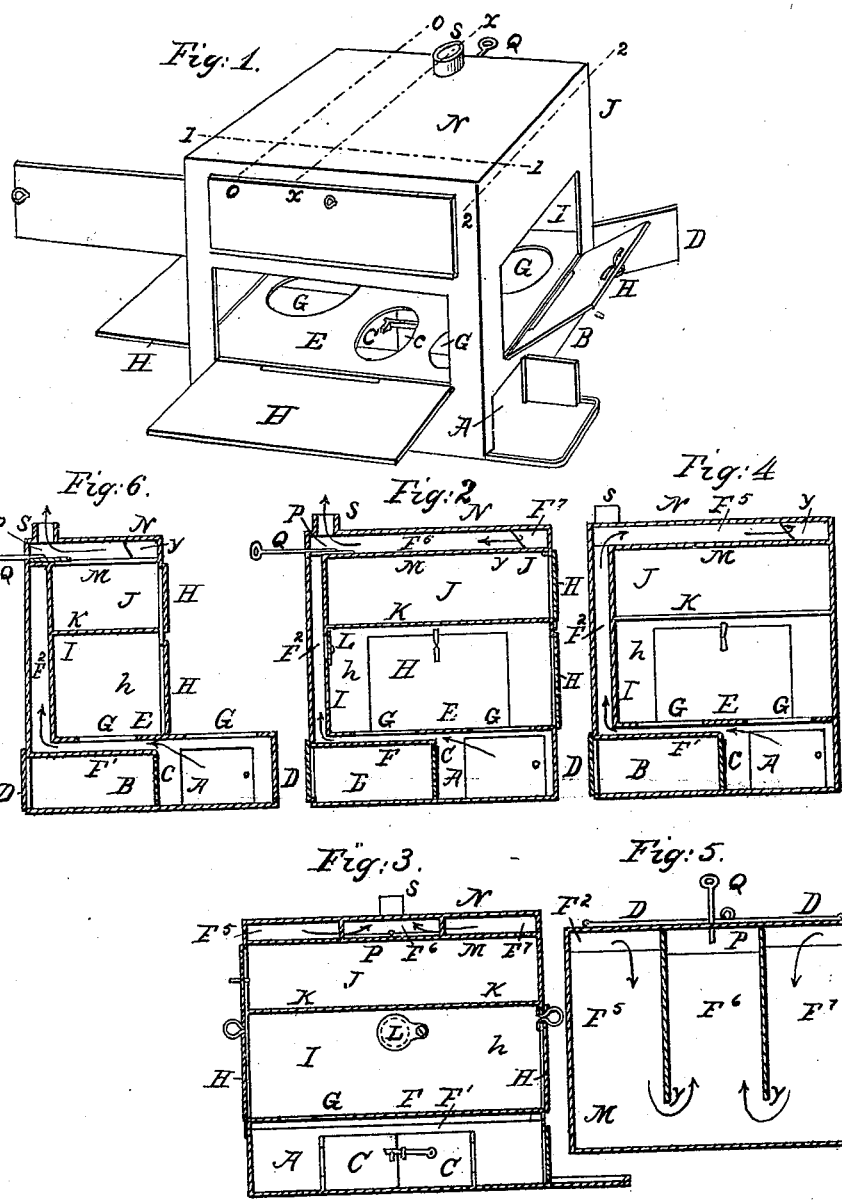

UNITED STATES PATENT OFFICE.

JOHN PORTER, OF GETTYSBURG, PENNSYLVANIA.

COOKING-STOVE.

Specification of Letters Patent No. 4,274, dated November 18, 1845.

*To all whom it may concern:*

Be it known that I, JOHN PORTER, of Gettysburg, Adams county, State of Pennsylvania, have invented a new and useful Cook-Stove, which is described as follows, reference being had to the annexed drawings of the same, making part of this specification.

Figure 1 is a perspective view of the stove, the door of the fire chamber and the doors of the boiling apartment being open to show the interior. Fig. 2 is a transverse section at the center of the stove at the line $x\ x$ of Fig. 1. Fig. 3 is a vertical longitudinal section through the center of the fire chamber showing the valve over the aperture through which the vapors from the boilers pass to the smoke flue, drawn at the line 1 1 of Fig. 1. Fig. 4 is a vertical transverse section at the line $o\ o$ of Fig. 1. Fig. 5 is a horizontal section at the line 11, 11. Fig. 6 is a vertical section of a modification of the stove.

A represents the chamber of combustion made about half the width of the stove its full length and one fourth the height.

B represents a roasting oven made about the size of the fire chamber having two doors C C, Fig. 1, communicating with the fire chamber and opened whenever the radial heat from the fire is required within said oven for roasting meat, heating irons and for other purposes.

D D, (see Fig. 5) the outside doors are placed on the back side of the stove at the bottom thereof for obtaining access to the oven B of said stove.

E represents a horizontal plate, the length of the stove and nearly as wide containing a number of holes G for cooking utensils placed above the top plate of the aforesaid roasting oven and far enough from it to form a horizontal flue F' over said oven and within a short distance of the back of the stove, leaving sufficient space for a vertical flue $F^2$ with which the aforesaid horizontal flue communicates. Some of the holes come directly over the fire chamber. When the culinary vessels are inserted into their proper places over these holes their bottoms are level with the top plate of the fire chamber and the top plate of the horizontal flue over the aforesaid roasting oven, where they are acted on by the smoke and heat in boiling, &c. This perforated plate and the culinary articles thereon are surrounded or inclosed by a number of hinged plates or doors H on three sides of the stove and by the inner plate I on the back side of the vertical flue aforesaid and by a loose horizontal plate K K divided at the middle into two parts which form the bottom of a baking oven J constructed or formed above the space $h$ embraced by said plates E H I and K, and which space constitutes the boiling apartment. The vapors and gases arising from the several vessels pass off through an opening leading into the vertical flue $F^3$. This opening is represented as closed by the valve L, Fig. 3. The heat arising from the aforesaid boiling vessels acts upon the loose plates K constituting the bottom of the baking oven, as described and heats them. By means of the aforesaid hinged plates H of the boiling apartment $h$, cooking may be performed in a parlor without the odors escaping into the room. The doors H, however, may be let down to a horizontal position and used to support dishes and other articles, and all the boilers be exposed to view, as represented in the drawing, Fig. 1.

The top of the baking oven is formed by a horizontal plate M arranged between the top N of the stove and the loose plates K (forming the bottom of the oven as above described) said plate M also forming the lower plate of the upper return flues $F^5$ $F^6$ $F^7$. The front and sides of the stove form also the three sides of the baking oven; the back is formed by an extension upward of the aforesaid vertical plate I forming the back of the boiling apartment. The sides are provided with suitable doors.

The vertical flue at the back of the stove is divided into three vertical flues $F^2$ $F^3$ $F^4$ extending from the top of the stove down to the top of the roasting oven. The central flue $F^3$ is provided with a horizontal sliding damper P for opening or closing said flue at pleasure. It is generally opened on kindling the fire and closed while cooking. The handle Q by which it is shoved back and forth is represented at Q in Figs. 1, 2 and 5. In these figures it is represented as closed over the top of the central flue $F^3$. The top flue is divided into three horizontal parallel flues $F^3$ $F^6$ $F^7$ by two parallel vertical plates extending from the back plate of the stove to near the front plate thereof where the ends are sloped as at Y. The smoke first passes into the horizontal flue F' thence into the side vertical flues $F^2$ $F^4$, thence into the side horizontal flues $F^5$ and $F^7$, thence to the central horizontal flue $F^6$ and thence to the smoke pipe S as indicated by the arrows. The degree of heat on the bottom plates of the oven K may re regulated at will by means of the doors H. The top and back plates of the oven are heated by the smoke and heat passing through the flues.

One half of the stove above the fire chamber from front to back may be omitted so as to expose some of the boilers having a plate covering the cut off part of the oven. The vertical section of the stove would then resemble Fig. 6.

What I claim as my invention and desire to secure by Letters Patent, is—

The combination and arrangement of the fire chamber A and roasting oven B having doors C C opening into the fire chamber when direct radial heat is required in the oven.

2. I also claim the combination of the boiling apartment $h$ and baking oven J constructed in the manner set forth.

JOHN PORTER.

Witnesses:
BENJAMIN HERR,
WM. P. ELLIOT.